(12) United States Patent
Kuntz et al.

(10) Patent No.: US 8,461,535 B2
(45) Date of Patent: Jun. 11, 2013

(54) PHASE STABLE RARE EARTH GARNETS

(75) Inventors: Joshua D. Kuntz, Livermore, CA (US);
Nerine J. Cherepy, Oakland, CA (US);
Jeffery J. Roberts, Livermore, CA (US);
Stephen A. Payne, Castro Valley, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 391 days.

(21) Appl. No.: 12/778,007

(22) Filed: May 11, 2010

(65) Prior Publication Data

US 2010/0294939 A1 Nov. 25, 2010

Related U.S. Application Data

(60) Provisional application No. 61/179,862, filed on May 20, 2009.

(51) Int. Cl.
*G01T 1/20* (2006.01)
(52) U.S. Cl.
USPC .................................................. 250/361 R
(58) Field of Classification Search
USPC ............... 250/361 R; 252/301.4 R; 501/152, 501/153
See application file for complete search history.

(56) References Cited

U.S. PATENT DOCUMENTS

| 5,057,692 | A | * | 10/1991 | Greskovich et al. | ...... 250/361 R |
| 8,039,413 | B2 | | 10/2011 | Hollingsworth et al. | |
| 2005/0215419 | A1 | * | 9/2005 | Takagimi et al. | ............. 501/152 |
| 2010/0105539 | A1 | | 4/2010 | Hollingsworth et al. | |

FOREIGN PATENT DOCUMENTS

| WO | 2005/044947 | 5/2005 |
| WO | 2008/048720 | 4/2008 |

OTHER PUBLICATIONS

Kanai et al., "Characteristics of a Nonstoichiometric $Gd_{3+\delta}(Al,Ga)_{5-\delta}O_{12}$:Ce Garnet Scintillator", © 2007 The American Ceramic Society, Journal of The America Ceramic Society, vol. 91, No. 2, p. 456-462 (2008).
Kuzmicheva et al., "Crystal chemical aspect of synthesis of laser crystals with garnet structure in $Ln_2O_3$-$Sc_2O_3$-$M_2O_3$ systems (Ln=Y, Gd; M=Ga, Al)" Spring New York, SpringerLink, Mar. 23, 2007, Journal of Structural Chemistry, vol. 35, No. 5, Sep. 1994.
M. Kokta, "Solubility enhancement of $Nd^{7+}$ in scandium-substituted rare earth—aluminum garnets" © 2010 Elsevier B.V., ScienceDirect Journal of Solid State Chemistry, vol. 8, Issue 1, Sep. 1973, p. 39-43.
Lutts et al., "GSAG and YSAG: a study on isomorphism and crystal growth" Springer Netherlands, SpringerLink, Aug. 15, 2005 Optical and Quantum Electronics, vol. 22, Supplement 1, Jul. 1990.
U.S. Appl. No. 61/179,862, filed May 20, 2009.

* cited by examiner

*Primary Examiner* — David Porta
*Assistant Examiner* — Faye Boosalis
(74) *Attorney, Agent, or Firm* — Dominic M. Kotab

(57) ABSTRACT

A transparent ceramic according to one embodiment includes a rare earth garnet comprising $A_hB_iC_jO_{12}$, where h is 3±10%, i is 2±10%, and j is 3±10%. A includes a rare earth element or a mixture of rare earth elements, B includes at least one of aluminum, gallium and scandium, and C includes at least one of aluminum, gallium and scandium, where A is at a dodecahedral site of the garnet, B is at an octahedral site of the garnet, and C is at a tetrahedral site of the garnet. In one embodiment, the rare earth garment has scintillation properties. A radiation detector in one embodiment includes a transparent ceramic as described above and a photo detector optically coupled to the rare earth garnet.

30 Claims, 8 Drawing Sheets

| Scintillator | $Z_{eff}$ | Density (g/cm³) | $\lambda_{max}$ (nm) | Principal Decay time (ns) | Light Yield (Ph/MeV) | Energy Resolution (662 keV) |
|---|---|---|---|---|---|---|
| NaI(Tl) | 51 | 3.67 | 440 | 230 | 40,000 | 7% |
| LaBr$_3$(Ce) | 44 | 5.07 | 360 | 20 | 60,000 | <3% |
| SrI$_2$(Eu) | 49 | 4.55 | 410 | 1300 | 90,000 | <3% |
| BGO | 75 | 7.13 | 480 | 300 | 9,000 | 8% |
| Lu$_3$Al$_5$O$_{12}$(Ce) | 61 | 6.73 | 550 | 70 | 30,000 | 6% |
| (Gd,Y)$_3$(Al, Ga)$_5$O$_{12}$(Ce) | >40 | 5.5-6 | 550 | 120 | 50,000 | 4% |

Figure 1

PHASE STABLE RARE EARTH GARNETS

RELATED APPLICATIONS

This application claims priority to Provisional U.S. Appl. No. 61/179,862 filed on May 20, 2009, which is herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to transparent ceramics, and particularly, to stable transparent ceramics, their precursors, and methods for making such ceramics.

BACKGROUND

Transparent ceramics have been successfully used in a variety of applications such as scintillator media in radiation detectors and computer tomography screens, gain media in solid state lasers, and strike faces of transparent armor systems for personnel protection from both military and civilian threats.

The principal hurdle in the processing of transparent ceramics is that current approaches are limited to the relatively few possible materials with thermodynamically stable cubic crystal structures. The class of materials from the rare earth aluminum and rare earth gallium garnets requires particularly narrow compositional ranges to result in single phase ceramics. Cubic crystal structures are required in order for optical scatter to be low enough to result in transparency. So far, transparent ceramics from non-cubic crystal structures have required either very small grain sizes (nanometer-scale) or very large grain sizes (millimeter-scale), where scatter arising from the birefringence of non-cubic phases is minimized. These fabrication regimes are not typical for ceramics processing; in fact, grain sizes in the 1-10 micron range are more typical, and require cubic crystal structures in order to achieve acceptable optical transparency.

Researchers in the area of transparent ceramics were previously only able to work in the limited number of rare-earth aluminum and gallium garnet compositions that are thermodynamically stable from the processing temperature to operation temperature. To satisfy the very narrow range of chemical compositions processors of starting materials for transparent ceramics have relied on extremely accurate analyses of the metal contents of the chemical precursors or have retreated to an iterative approach of varying the composition of the chemical precursors, processing the powders to dense ceramics, examining the finished ceramics for secondary phases, and altering the starting composition to compensate for compositional error.

SUMMARY

A transparent ceramic according to one embodiment includes a rare earth garnet comprising $A_h B_i C_j O_{12}$, where h is 3±10%, i is 2±10%, and j is 3±10%. A includes a rare earth element or a mixture of rare earth elements, B includes at least one of aluminum, gallium and scandium, and C includes at least one of aluminum, gallium and scandium, where A is at a dodecahedral site of the garnet, B is at an octahedral site of the garnet, and C is at a tetrahedral site of the garnet.

In one embodiment, the rare earth garment has scintillation properties.

A radiation detector in one embodiment includes a transparent ceramic as described above and a photo detector optically coupled to the rare earth garnet.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a table of scintillator materials for gamma ray spectroscopy.

DETAILED DESCRIPTION

Figure 2:
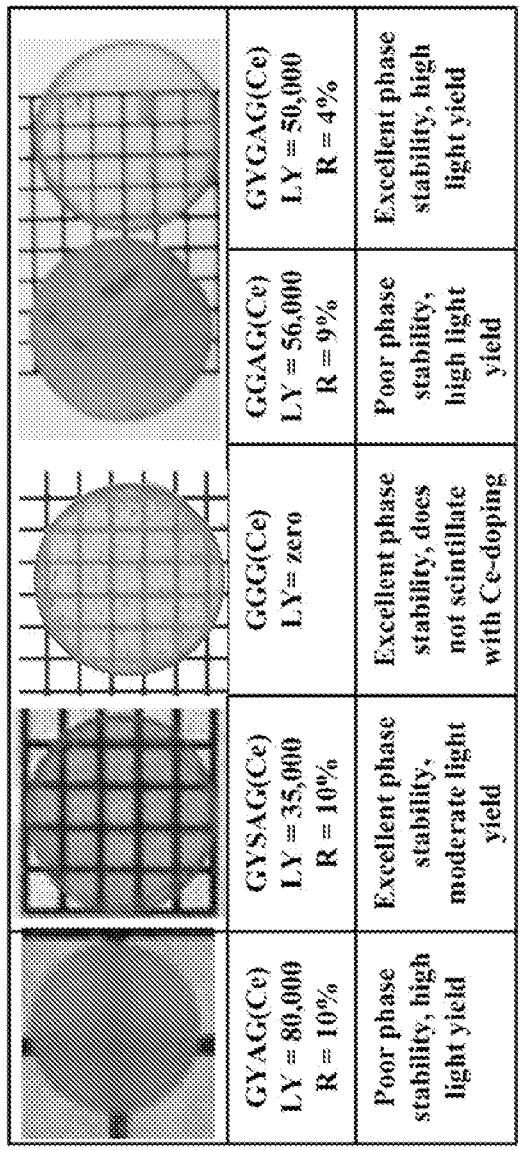
FIG. 2 shows several compositions of gadolinium garnets, doped with cerium; the optical transparency thereof indicating the relative phase stability of the respective garnet.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As used herein, the term "about" when combined with a value refers to plus and minus 10% of the reference value. For example, an atomic percent of about 10 refers to an atomic percent of 10±1, a refractive index of about 0.2 refers to a refractive index of 0.2±0.02, etc.

In the field of transparent ceramics, the rare earth aluminum garnets are materials of great interest because of their unique properties. Various compositions of rare earth garnets have uses as optical components, laser amplifiers, and scintillators. One of the main challenges of working with these materials is the narrow composition range that leads to the presence of a single phase in the final ceramic part, especially for larger parts. Single phase starting material is generally critical to achieving transparency in these ceramics. Note that "transparency" and "transparent" in some embodiments include "translucency" and "translucent."

The following description discloses, among other things, the use of additions of scandium and/or gallium ions as a phase stabilizer in rare earth aluminum garnets. In some embodiments, scandium and/or gallium ions are used as a phase stabilizer in rare earth garnets that inhibits the production of secondary phases during synthesis.

The garnet crystal structure according to some embodiments generally includes cations with dodecahedral (A), octahedral (B) and tetrahedral (C) coordination, in the formula $A_3B_2C_3O_{12}$, where the stoichiometric amounts of A, B and C in the formulae presented herein are about 2, 3, and 2, respectively. It has surprisingly been found that scandium can substitute into the A and the B sites and gallium can substitute into both the B and C sites within the crystal structure to promote single phase transparent ceramic garnets, even if the starting composition is slightly off-stoichiometry. Small fractions of scandium or gallium can be added to a garnet composition to promote the formation of the cubic garnet phase in materials where other phases, such as perovskite, are the thermodynamically stable crystal structure. Additionally, the ability of scandium to occupy multiple coordination sites, e.g., cation site-types, within the garnet crystal structure allows for variation in the chemical stoichiometry of a particular composition without the formation of secondary phases within the ceramic part, thereby promoting the ability to achieve transparency.

As noted above, garnet chemical composition according to some embodiments can be expressed by the generic chemical composition $A_3B_2C_3O_{12}$, were A is the dodecahedral site, B is the octahedral site, and C is the tetrahedral site. In rare earth aluminum garnets A includes a rare earth element or a mixture of rare earth elements, and B and C are aluminum. With rare earth gallium garnets according to some embodiments, A includes a rare earth element or a mixture of rare earth elements, and B and C are both gallium.

In mixed rare earth aluminum-gallium garnets according to some embodiments, A includes a rare earth element or a mixture of rare earth elements, and one or more of B and C include aluminum and gallium. The generic formula for mixed rare earth aluminum-gallium garnets is $RE_3(Al_{2-x}Ga_x)(Al_{3-y}Ga_y)O_{12}$, where RE includes or is a rare earth element or a mixture of rare earth elements (such as yttrium, gadolinium, lutetium, lanthanum, terbium, praseodymium, cerium samarium europium, dysprosium, holmium, erbium, ytterbium and/or mixtures thereof), x is 0 to about 2 and y is 0 to about 3.

One embodiment includes a rare-earth aluminum-scandium garnet composition such that scandium substitutes into the A or B or C site or some mixture of the three sites, where A is the dodecahedral site and B is the octahedral site. The generic formula for rare-earth aluminum-scandium garnets is $RE_3(Al_{2-x}Sc_x)(Al_{3-y}Sc_y)O_{12}$, where RE includes or is a rare earth element or mixture of rare earth elements, x is 0 to about 2, and y is 0 to about 3.

Another embodiment includes the substitution of scandium into the mixed rare-earth aluminum-gallium garnet composition such that scandium substitutes into only the A or B site or some mixture of the two sites, where A is the dodecahedral site and B is the octahedral site. The generic formula for scandium-substituted mixed rare-earth aluminum-gallium garnets is $(RE_{3-u}Sc_u)(Al_{2-x-v}Ga_xSc_v)(Al_{3-y}Ga_y)O_{12}$, where RE includes or is a rare earth element or mixture of rare earth elements, x is 0 to about 2, y is 0 to about 3, u is 0 to about 0.5, and v is 0 to about 2.

For scintillator applications, cerium, terbium, europium, and/or praseodymium may be added as a dopant to act as an activator either individually or in combination with other activators.

Yet another embodiment includes $(Gd_{3-a}Y_a)_x(Ga_{5-b}Al_b)_yO_{12}RE_z$, where a is between about 0.1 and about 2; b is between about 1 and about 4.95; x is between about 2.8 and about 3.2; y is between about 4.8 and about 5.2; z is between about 0.002 and about 0.1; and RE is Ce and/or Pr. In one particularly preferred embodiment, found to be particularly phase stable and producing a high light yield scintillator is $Gd_{1.49}Y_{1.49}Ce_{0.02}Ga_{2.20}Al_{2.80}O_{12}$. When the (Gd, Y) to (Ga, Al) ratio is varied over a limited range, stability is maintained.

In one particularly preferred embodiment of a Sc-containing composition, the amount of Sc is minimized in order to preserve high light yield. Such an embodiment includes $(Gd_{3-a}Y_a)_x(Sc_{5-b}Al_b)_yO_{12}RE_z$, where a is between about 0.1 and about 2; b is between about 1 and about 4.95; x is between about 2.8 and about 3.2; y is between about 4.8 and about 5.2; z is between about 0.002 and about 0.1; and RE is Ce and/or Pr.

In another general embodiment, a transparent ceramic includes a rare earth garnet comprising $A_hB_iC_jO_{12}$, where h is 3±10%, i is 2±10%, and j is 3±10%. A includes a rare earth element or a mixture of rare earth elements, B includes at least one of aluminum, gallium and scandium, and C includes at least one of aluminum, gallium and scandium. A is at a dodecahedral site of the garnet, B is at an octahedral site of the garnet, and C is at a tetrahedral site of the garnet. Such garnets may have scintillation properties, which is particularly useful when used as part of or in conjunction with a radiation detector.

In one preferred embodiment, the garnet comprises $(RE_{3-u}Sc_u)(Al_{2-x-v}Ga_xSc_v)(Al_{3-y}Ga_y)O_{12}$, where RE is at least one rare earth element (such as at least one of yttrium, gadolinium, lutetium, lanthanum, terbium, praseodymium, cerium samarium europium, dysprosium, holmium, erbium, ytterbium and/or mixtures thereof), x is 0 to about 2, y is 0 to about 3, u is 0 to about 0.5, and v is 0 to 2. In one approach, x is 0 to about 1.5, y is 0 to about 2.5, u is 0 to about 0.25, and v is 0 to about 1.5. In another approach, x is 0, y is 0, u is 0 to about 0.5, and v is 0 to about 2. In yet another approach, x is 0 to about 2, y is 0 to about 3, u is 0, and v is 0. In a further approach, x is 0, y is 0, u is 0 to about 0.25, and v is 0 to about 0.25.

In another preferred embodiment, the garnet comprises $(RE_{3-u}Sc_u)(Ga_{2-v}Sc_v)Ga_3O_{12}$, where u is 0 to about 0.5, and v is 0 to about 2.

In yet another preferred embodiment, the garnet comprises $(Gd_{1-a}Y_a)_x(Sc_{1-b}Al_b)_yO_{12}RE_z$, where a is between about 0.05 and about 1; b is between about 0.2 and about 0.99; x is between about 2.8 and about 3.2; y is between about 4.8 and about 5.2; z is between about 0.002 and about 0.5; and RE is Ce and/or Pr.

In another preferred embodiment, the garnet comprises $(Gd_{1-a}Y_a)_x(Ga_{1-b}Al_b)_y O_{12} RE_z$, where a is between about 0.05 and about 1; b is between about 0.2 and about 0.99; x is between about 2.8 and about 3.2; y is between about 4.8 and about 5.2; z is between about 0.002 and about 0.5; and RE is Ce and/or Pr.

In a further preferred embodiment, the garnet comprises $Gd_x(Ga_{1-a}Al_a)_y O_{12} RE_z$, where a is between about 0.01 and about 0.99; x is between about 2.8 and about 3.2; y is between about 4.8 and about 5.2; z is between about 0.002 and about 0.5; and RE is Ce and/or Pr.

In another preferred embodiment, the garnet comprises $(Gd_{1-a}Y_a)_x(Ga_{1-b}Al_b)_y O_{12} RE_z$, where a is between about 0.05 and about 1; b is between about 0.2 and about 0.99; x is between about 2.8 and about 3.2; y is between about 4.8 and about 5.2; z is between about 0.002 and about 0.5; and RE is Ce and/or Pr. This transparent ceramic is particularly suitable for use as a scintillating gamma radiation detector.

In yet another preferred embodiment, the garnet comprises $(Gd_{1-a}Y_a)_x(Sc_{1-b}Al_b)_y O_{12} RE_z$, where a is between about 0.05 and about 1; b is between about 10.2 and about 0.99; x is between about 2.8 and about 3.2; y is between about 4.8 and about 5.2; z is between about 0.002 and about 0.5; and RE is Ce and/or Pr. This transparent ceramic is particularly suitable for use as a scintillating gamma radiation detector.

In a further preferred embodiment, the garnet comprises $(Gd_{1-a}Y_a)_x(Ga_{1-b}Al_b)_y O_{12} RE_z$, where a is between about 0.33 and about 0.67; b is between about 0.4 and about 0.6; x is between about 2.8 and about 3.2; y is between about 4.8 and about 5.2; z is between about 0.002 and about 0.5; and RE is Ce and/or Pr. This transparent ceramic is particularly suitable for use as a scintillating gamma radiation detector.

In yet another preferred embodiment, the garnet comprises $(Gd_{1-a}Y_a)_x(Sc_{1-b}Al_b)_y O_{12} RE_z$, where a is between about 0.33 and about 0.67; b is between about 0.8 and about 0.99; x is between about 2.8 and about 3.2; y is between about 4.8 and about 5.2; z is between about 0.002 and about 0.5; and RE is Ce and/or Pr. This transparent ceramic is particularly suitable For use as a scintillating gamma radiation detector.

Not all rare earth elements form a cubic garnet crystal structure with aluminum and gallium, even under the correct stoichiometric ratio. This is due to the requirement that the ratio of ionic radii of dodecahedral to octahedral to tetrahedral being limited to an optimal range for the cubic garnet crystal structure. An example of a composition is $Gd_3Al_5O_{12}$ with poor phase stability as garnet. Gd-based garnets are of particular interest for scintillation because they offer a high effective atomic number for gamma ray interaction, and have been found to have high light yields. $Gd_3Al_5O_{12}$, is not phase-stable; rather it forms a mixture of garnet and perovskite phases and is unsuitable for forming transparent parts. However, it has been surprisingly and unpredictably found that by adding scandium and/or gallium in the range of u+v between about 0.12 and about 0.5, the ceramic is a single phase garnet after processing that can easily be formed into a transparent ceramic.

Without wishing to be bound by any particular theory, it is believed that scandium and gallium may occupy multiple site-types within the garnet crystal. For example, the ability of scandium to occupy multiple site-types within the garnet crystal structure allows for variation in the chemical stoichiometry of a particular composition without the formation of secondary phases within the ceramic part. Because scandium can occupy both dodecahedral and octahedral sites, one can aim for a given composition but have error in stoichiometry and the scandium site occupancy ratio can shift resulting in another stoichiometric composition, which surprisingly exhibits phase stability. Two examples are presented below:

EXAMPLE 1

Rare Earth Rich, Aluminum Poor

Intended composition: $(Gd_{1.35}Y_{1.35}Sc_{0.3})(Sc_{0.2}Al_{1.8})Al_3O_{12}$
Actual composition un-shifted: $(Gd_{1.425}Y_{1.425}Sc_{0.3})(Sc_{0.2}Al_{1.65})Al_3O_{12}$
Actual composition shifted: $(Gd_{1.425}Y_{1.425}Sc_{0.15})(Sc_{0.35}Al_{1.65})Al_3O_{12}$

EXAMPLE 2

Rare Earth Poor, Aluminum Rich

Intended composition: $(Gd_{1.35}Y_{1.35}Sc_{0.3})(Sc_{0.2}Al_{1.8})Al_3O_{12}$
Actual composition un-shifted: $(Gd_{1.275}Y_{1.275}Sc_{0.3})(Sc_{0.2}Al_{1.95})Al_3O_{12}$
Actual composition shifted: $(Gd_{1.275}Y_{1.275}Sc_{0.45})(Sc_{0.05}Al_{1.95})Al_3O_{12}$ EXAMPLES 3 and 4

Figure 10:
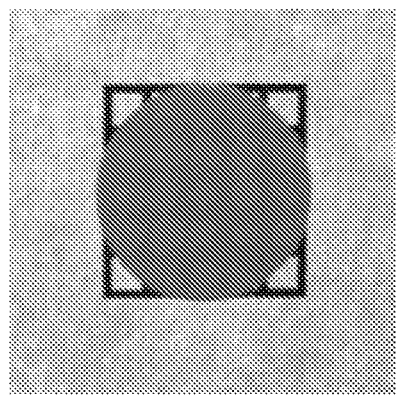
FIG. 10 shows a transparent $(Gd_{1.5}Y_{1.5})Al_2Al_3O_{12}+0.025$ $Al_2O_3$ ceramic.
Figure 11:
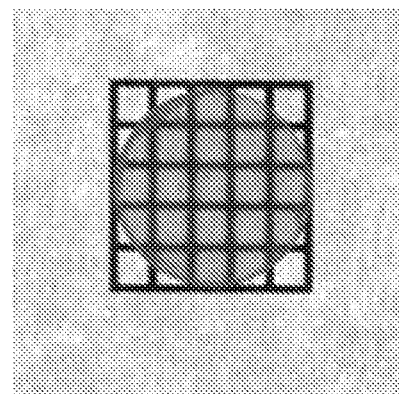
FIG. 11 shows a transparent $(Gd_{1.325}Y_{1.325}Sc_{0.35})$ $(Sc_{0.15}Al_{1.85})Al_3O_{12}$, ceramic with Sc stabilizer according to one embodiment.

In conjunction with FIGS. 10 and 11, demonstrate the effect of phase stabilizers in garnets.

EXAMPLE 3

Unstabilized Rare Earth Poor, Aluminum Rich

Intended composition: $(Gd_{1.5}Y_{1.5})Al_2Al_3O_{12}$
Actual composition with excess Al (1 at. %): $(Gd_{1.475}Y_{1.475})Al_{2.05}Al_3O_{12}$
Actual composition w/ secondary phase: $(G_{1.5}Y_{1.5})Al_2Al_3O_{12} + 0.025 Al_2O_3$, shown in FIG. 10

EXAMPLE 4

Sc-Stabilized Rare Earth Poor, Aluminum Rich

Intended composition: $(Gd_{1.35}Y_{1.35}Sc_{0.3})(Sc_{0.2}Al_{1.8})Al_3O_{12}$
Actual composition with excess Al (1 at. %): $(Gd_{1.325}Y_{1.325}Sc_{0.3})(Sc_{0.2}Al_{1.85})Al_3O_{12}$
Actual composition w/Sc shift: $(Gd_{1.325}Y_{1.325}Sc_{0.35})(Sc_{0.15}Al_{1.85})Al_3O_{12}$, shown in FIG. 11

As evident from the comparison of FIGS. 10 and 11, the addition of Scandium greatly reduces presence of a secondary phase. Moreover, in experiments generally conforming to Example 4, the Sc:Al ratio was varied from 4:1 to 1:4 with no secondary phases.

As long as the initial off-stoichiometry precursor composition lies within the maximum allowable shift in scandium composition, the materials will still be single phase. Such a result was surprising and unpredictable, and is a significant discovery.

The combination of scandium and/or gallium acting as a phase stabilizer when substituted into non thermodynamically stable compositions and as a stoichiometry error corrector when substituted into off-stoichiometry composition of mixed rare earth aluminum garnets makes Sc and Ga addition a truly valuable tool for anyone attempting to process transparent ceramic rare-earth garnets. For example, by relaxing the requirement for ultra-precise stoichiometric ratios, one may overcome the inherent difficulties in creating precise precursor compositions that would otherwise be needed leading to significant cost reduction for fabrication.

Further examples of rare-earth garnet compounds that could benefit from small Sc or Ga additions for phase stabilization include but are not limited to garnets formed from: Y, Gd, Lu, La, Tb, Pr, Ce, Nd, Pm, Sm, Eu, Dy, Ho, Er, Tm, Yb and/or mixtures thereof in the "A" site (potentially with Sc and/or Ga); and Al with Sc and/or Ga in the "B" and/or "C" sites. Additionally, the above stated garnets benefit from the allowable compositional range of rare earth aluminum-gallium garnets. That is the ability for Ga and Al to occupy both the octahedral (B) and tetrahedral (C) crystal sites. This allows for variations between the intended Ga to Al ratio and the actual ratio to be accommodated by a shift in site occupancy ratios without resulting in the formation of secondary phases.

Particularly preferred rare earth elements for scintillator applications include Gd and Tb. Moreover, Gd-containing scintillator embodiments have unexpectedly been found to provide a surprisingly high light yield relative to the embodiments with other rare earth elements. This higher light yield results in gamma ray spectroscopy energy resolution superior to any known oxide scintillator. The Gd ions also improve the efficiency of the gamma stopping.

One particularly preferred embodiment includes A of the general formula above comprising gadolinium and yttrium in about equal stoichiometric portions. In another approach, A of the general formula above comprises gadolinium and lutetium.

Dense, transparent polycrystalline ceramics may be formed by cold pressing green bodies that are subsequently vacuum sintered, and residual porosity removed by hot isostatic pressing. Further details on various approaches to ceramics fabrication are available in U.S. patent application Ser. Nos. 12/603,195 and 12/603,247, which were both filed Oct. 21, 2009 and which are herein incorporated by reference.

Other approaches to making transparent ceramics according to various embodiments include hot pressing, direct hot isostatic pressing (without gel casting), melt growth, etc.

One embodiment of the present invention provides a versatile, scalable fabrication method, using Flame Spray Pyrolysis (FSP) to produce feedstock which is readily converted into phase-pure transparent ceramics. Such transparent ceramics may offer an alternative to single crystals for scintillator applications such as gamma ray spectroscopy and radiography. The inventors have measured integral light yields in excess of 80,000 Ph/MeV with cerium-doped garnets, and excellent optical quality.

Avalanche photodiode readout of garnets according to some embodiments provides a resolution near 4%. For radiography applications, lutetium oxide offers a high performance metric and is formable by ceramics processing. Scatter in transparent ceramics due to secondary phases is the principal limitation to optical quality.

Inorganic scintillators are used in radiation detectors for medical imaging, high energy physics, and environmental radiation monitoring applications. Currently, LaBr$_3$(Ce) and SrI$_2$(Eu) single crystal scintillators provide the best energy resolution, 2.6-2.7% at 662 keV, while NaI(Tl) is the most widely deployed for gamma ray spectroscopy but only offers about 7% resolution at 662 keV. Gamma ray spectrometers providing high sensitivity and effective isotope identification require high energy resolution, high Z and materials that are growable in large size. The family of cerium-doped gadolinium garnet scintillators according to some embodiments of the present invention appears to meet these requirements. A summary of properties of scintillator materials is provided in the table of FIG. 1.

Gadolinium garnets feature high gamma stopping power and high light yields, however the simple gadolinium aluminum garnet phase is thermodynamically unstable, so ions such as yttrium, scandium and/or gallium are used to stabilize the garnet phase in some embodiments. Garnet single crystals are typically grown by the Czochralski method, rendering production of large-sized optics expensive. Transparent polycrystalline ceramics not only allow production costs to be reduced, but the activator concentration and uniformity can be enhanced. Cubic crystal phases are preferred for ceramics since scatter from the typical transparent ceramic grain size (~3 microns) can become deleterious for birefringent materials.

Figure 3:
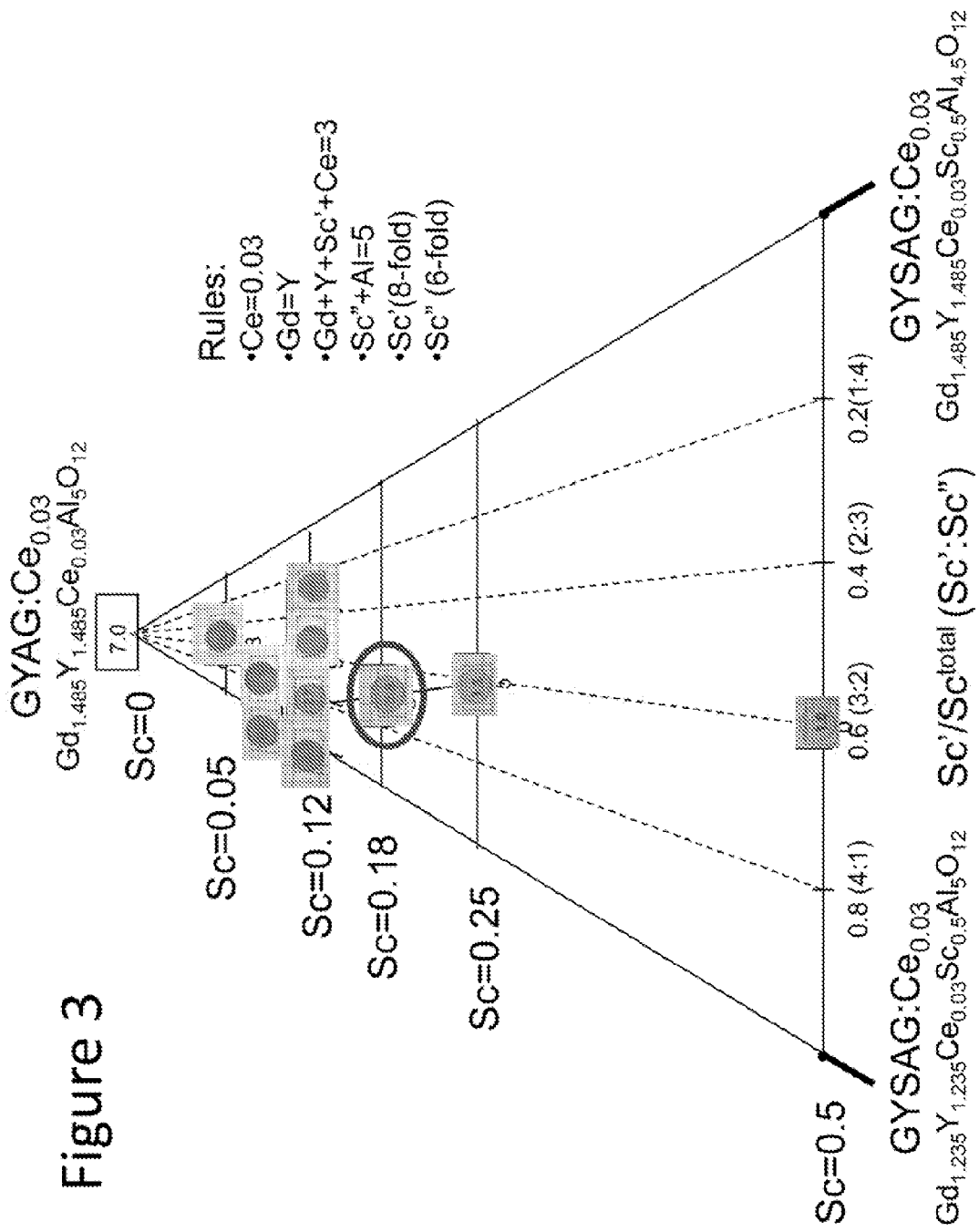
FIG. 3 shows a ternary diagram for the GYSAG system, where the photographs of the ceramics made with different compositions reveal the region of phase stability that requires Sc substitution on both the 8-fold and 6-fold coordinate sites, and an atomic fraction of greater than 0.1.

During the experiments, a series of gadolinium garnet ceramics were fabricated and characterized. It was surprisingly found that the addition of scandium and or gallium facilitates phase stabilization and transparency. Photographs of several of the ceramics characterized in the experiments are shown in FIG. 2 and FIG. 3. Provisional U.S. Appl. No. 61/179,862, which has been incorporated by reference.

Figure 4:
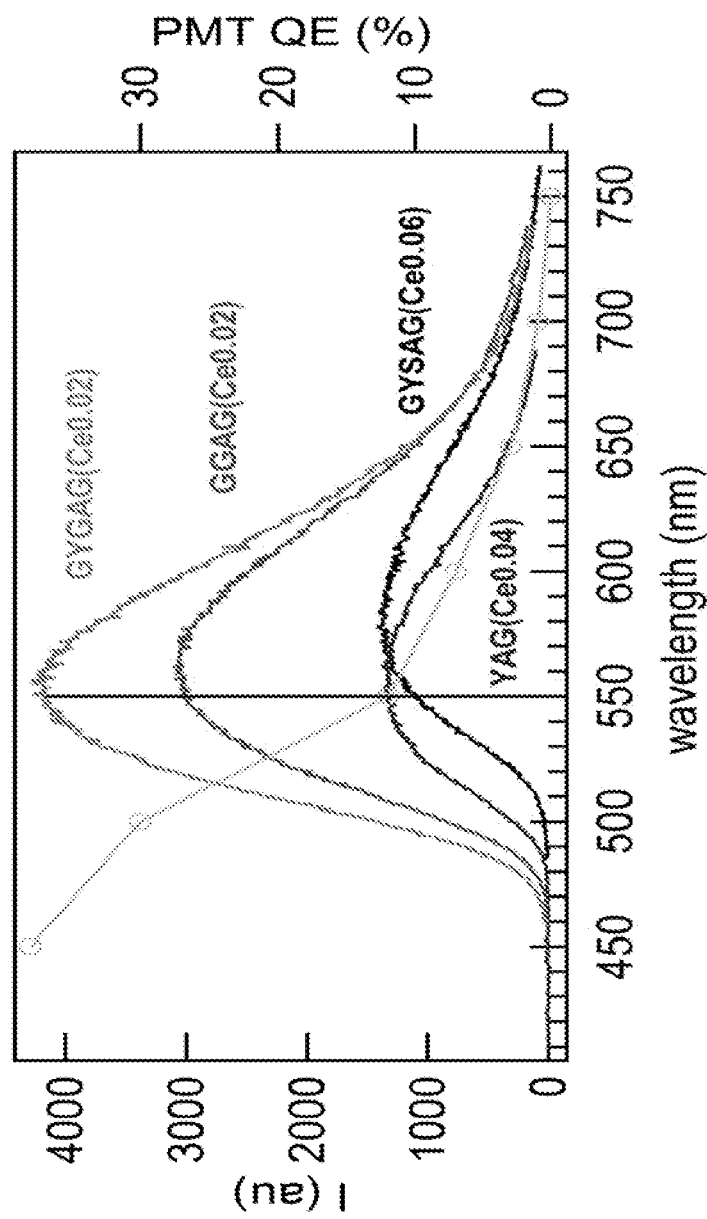
FIG. 4 is a graph showing beta-excited radioluminescence spectra acquired from Ce-doped gadolinium garnets according to some embodiments.

Under steady-state beta excitation, the emission spectra recorded represent the integral luminescence over all timescales. Beta radioluminescence employed a $^{90}$Sr/$^{90}$Y source (~1 MeV average beta energy). Radioluminescence spectra were collected with a Princeton Instruments/Acton Spec 10 spectrograph coupled to a thermoelectrically coated CCD camera. In FIG. 4, the beta excited luminescence of three gadolinium garnet ceramics are shown. While the measured integral light yield is very high for GYAG(Ce) (~100,000 Photons/MeV), some long decay components do not contribute to the scintillation light pulse measured in the pulse height spectra, and furthermore it offers only limited transparency, due to the presence of small amounts of a secondary phase, gadolinium aluminum Perovskite (GdAlO$_3$). In contrast, GSAG(Ce) offers a modest light yield (20,000 Photons/MeV), but is stable and transparent. Intermediate light yield and good transparency can be achieved with GYSAG(Ce) ceramics. Gadolinium garnets with gallium substitution produce the most promising results. Simple gadolinium gallium garnet doped with cerium, Gd$_3$Ga$_5$O$_{12}$(Ce) is very phase stable, as shown in FIG. 2, but non-luminescent, possibly due to the bandgap becoming too narrow, and the Ce$^{3+}$ state moving into the conduction band. Gadolinium garnet compositions including aluminum and/or yttrium, as well as gallium activate with cerium, offering high scintillation light yields. Phase stability and high light yield are achieved for a compositional range, similar to that illustrated for GYSAG in FIG. 3.

Figure 5:
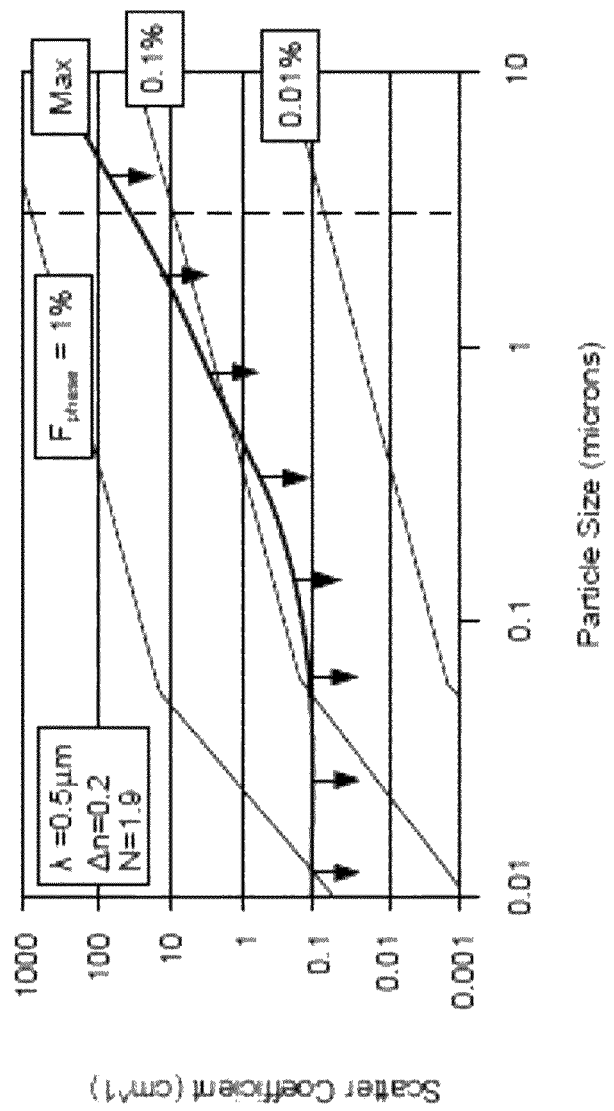
FIG. 5 is a graph showing the calculated scatter for a cubic crystalline material according to one embodiment containing secondary phase (refractive index 0.2 different from primary phase) inclusions as a function of secondary phase particle size.

FIG. 5 offers an illustrative assessment as to the acceptable amount of secondary phase induced scatter in some ceramics, where the secondary phase component is taken to have an index difference of 0.2. FIG. 5 depicts the calculated scatter for a cubic crystalline material containing secondary phase (refractive index 0.2 different from primary phase) inclusions as a function of secondary phase particle size. The Raleigh and Mie scattering region are calculated, while the upper limit of acceptability (also shown) is taken as 0.1 cm$^{-1}$ for a 10 cm optic. Moreover, the emergence of forward-type scatter is accounted for in terms of the rise in the upper limit of acceptability for larger particles. From these plots, it is seen that on the order of 0.2% second phase material is permissible for a typical domain size of 3 micron, a fairly stringent criterion.

With continued reference to FIG. 5, the line labeled "Max" (maximum tolerable scatter for acceptable light collection)

reveals that for larger particle sizes, e.g., greater than about 1 micron mean diameter, the dominance of forward scatter permits a higher tolerable amount of scatter. Nevertheless, at a typical grain size of 3 microns, indicated by the vertical dashed line, the amount of secondary phase inclusions in this example should be held to less than 0.2%. For smaller particle sizes (e.g., about 0.5 to about 1 micron), the amount of secondary phase inclusions should be less than 0.1%. For particularly preferred ceramics, the particle size is between about 1 and about 10 microns.

Accordingly, the use of gallium and/or scandium for phase stabilization of the gadolinium garnets, combined with the incorporation of high cerium and/or praseodymium doping to suppress afterglow according to some embodiments provide a pathway to a useful transparent ceramic scintillator for gamma ray spectroscopy.

With bialkali photomultiplier tube (PMT) readout, Ce-doped gadolinium yttrium gallium aluminum garnet (GYGAG) single crystals offer 4% resolution at 662 keV, while yttrium aluminum garnet (YAG) and lutetium aluminum garnet (LuAG) ceramics provide about 6-7% resolution.

In one set of experiments, the garnet ceramics were formed using stoichiometric mixed metal oxide particles synthesized via flame spray pyrolysis. Fully dense, transparent polycrystalline ceramics were formed by cold pressing green bodies that were subsequently vacuum sintered, and residual porosity removed by hot isostatic pressing. Further details on various approaches to ceramics fabrication are available in U.S. patent application Ser. Nos. 12/603,195 and 12/603,247, which were both filed Oct. 21, 2009 and which are herein incorporated by reference.

Figure 6:
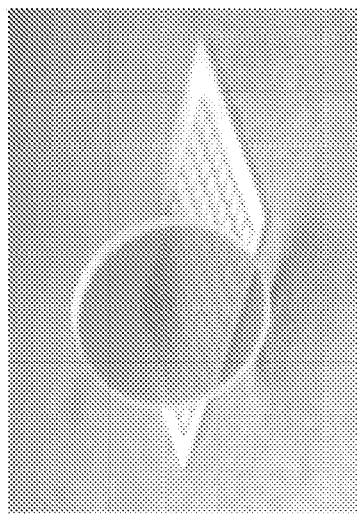
FIG. 6 shows a 0.08 cm$^3$ LLNL-fabricated GYGAG(Ce) ceramic with excellent transparency, due to its pure phase and full theoretical density, according to one embodiment.

Phase stable gadolinium yttrium aluminum garnet ceramics, doped with cerium, are readily fabricated in small and large sizes. FIG. 6 shows a small ceramic, ~0.1 cm$^3$, suitable for integration with an Avalanche Photodiode (APD) for a small gamma ray spectrometer.

Figure 7:
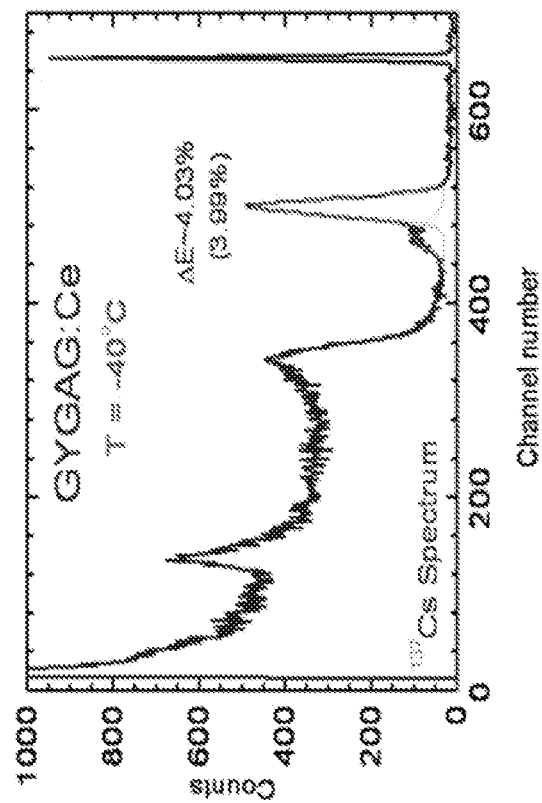
FIG. 7 is a chart depicting that when the ceramic from FIG. 6 is tested for gamma ray spectroscopy applications with a cooled Silicon avalanche photodiode, it provides 4% resolution at 662 keV. The small low-energy shoulder is due to the escape of Gd x-rays from the small scintillator.

The scintillation light produced by the sample from FIG. 6 under excitation with a $^{137}$Cs source (662 keV gamma) was detected with a cooled Avalanche Photodiode (APD) from Radiation Monitoring Devices (RMD), and found to offer 4% energy resolution at 662 keV, as shown in the chart of FIG. 7.

Figure 8:
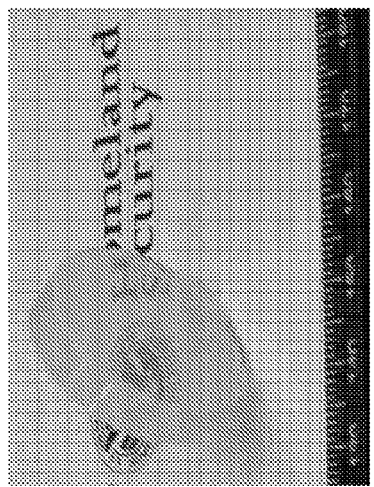
FIG. 8 shows a highly transparent, pure phase 3.7 cm$^3$ LLNL-fabricated GYGAG(Ce) ceramic according to one embodiment.
Figure 9:
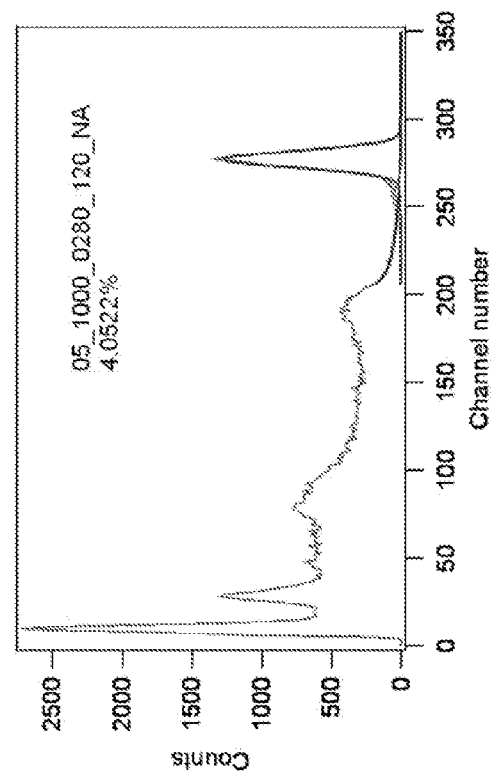
FIG. 9 is a chart depicting that when the ceramic from FIG. 8 is tested for gamma ray spectroscopy applications with PMT readout, it provides 4% resolution, with almost no escape peak (low energy shoulder).

The larger GYGAG(Ce) ceramic shown in FIG. 8 was coupled to a Hamamatsu R6231-100 PMT, signals were shaped with a Tennelec TC 244 spectroscopy amplifier and recorded with an Amptek MCA8000-A multi-channel analyzer, revealing energy resolution of 4% at 662 keV, as shown in FIG. 9.

Embodiments of the present invention can be used widely in the field of transparent ceramics. For example, it has potential use in the production of transparent ceramics as scintillators for radiation detection and computed tomography applications, as laser gain media for lasers including high average power lasers, and as specialized optical components such as Faraday rotators. Moreover, embodiments of the present invention have potential use in the production of transparent ceramics for such uses. Those skilled in the art will appreciate that the new and novel materials presented herein may be used in conjunction with known and potentially yet-to-be invented equipment. For example, a radiation detector may include a transparent ceramic according to one embodiment, and a photo detector. Preferably, the radiation detector has an energy resolution at 662 keV of less than 5%.

One skilled in the art will also appreciate that those rare earth elements such as La and Lu that have a mild radioactivity may not be desirable for scintillator applications, but may be useful in other applications such as medical applications where a high dose of radiation is received.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A transparent ceramic, comprising:
    a rare earth garnet,
    wherein the garnet comprises $(Gd_{1-a}Y_a)_x(Ga_{1-b}Al_b)_yO_{12}RE_z$, where a is 0 to about 1; b is between about 0.44 and about 0.7; x is between about 2.8 and about 3.2; y is between about 4.8 and about 5.2; z is between about 0.002 and about 0.5; and RE is Ce and/or Pr;
    wherein the transparent ceramic is characterized by a scatter coefficient less than about 0.1 cm$^{-1}$.

2. The transparent ceramic of claim 1, wherein the transparent ceramic is usable as a scintillating radiation detector.

3. The transparent ceramic of claim 1, wherein the rare earth garnet includes secondary phase inclusions in an amount less than about 0.2%.

4. The transparent ceramic of claim 1, wherein the ceramic is comprised of sintered particles.

5. The transparent ceramic of claim 1, wherein the ceramic is comprised of particles having interfaces therebetween characteristic of hot isostatic pressing.

6. The transparent ceramic of claim 1, further comprising a Sc in an amount of greater than 0 to about 16.67 atomic percent relative to a total amount of the Sc and the RE.

7. A radiation detector, comprising:
    the transparent ceramic of claim 1; and
    a photo detector optically coupled to the rare earth garnet.

8. The radiation detector of claim 7, wherein the radiation detector has an energy resolution at 662 keV of less than 5%.

9. The transparent ceramic of claim 7, wherein wherein the rare earth garnet includes secondary phase inclusions in an amount less than about 0.2%.

10. The transparent ceramic of claim 1, wherein the rare earth garnet includes secondary phase inclusions in an amount less than about 0.2%.

11. The transparent ceramic of claim 1, wherein b is between about 0.4 and about 0.6.

12. The transparent ceramic of claim 1, wherein b is between about 0.8 and about 0.99.

13. A transparent ceramic, comprising:
    a rare earth garnet comprising $A_hB_iC_jO_{12}$, the rare earth garnet having scintillation properties,
    wherein h is 3±10%,
    wherein i is 2±10%,
    wherein j is 3±10%,
    wherein A includes a rare earth element or a mixture of rare earth elements, B includes scandium and at least one of aluminum and gallium, and C includes at least one of aluminum and gallium, where A is at a dodecahedral site of the garnet, B is at an octahedral site of the garnet, and C is at a tetrahedral site of the garnet;
    wherein the transparent ceramic is characterized by a scatter coefficient less than about 0.1 cm$^{-1}$.

14. The transparent ceramic of claim 13, wherein the garnet comprises $(RE_{3-u}Sc_u)(Al_{2-x-v}Ga_xSc_v)(Al_{3-y}Ga_y)O_{12}$, where x is 0 to about 2, y is 0 to about 3, u is 0 to about 0.5, and v is greater than 0 to about 2, wherein the rare earth garnet includes secondary phase inclusions in an amount less than about 0.2%.

15. The transparent ceramic of claim 14, wherein RE includes at least one of yttrium, gadolinium, lutetium, lanthanum, terbium, praseodymium, cerium samarium europium, dysprosium, holmium, erbium, ytterbium and/or mixtures thereof.

16. The transparent ceramic of claim 14, wherein x is 0 to about 1.5, y is 0 to about 2.5, u is 0 to about 0.25, and v is greater than 0 to about 1.5.

17. The transparent ceramic of claim 14, wherein x is 0, y is 0, u is 0 to about 0.5, and v is greater than 0 to about 2.

18. The transparent ceramic of claim 14, wherein x is 0 to about 2, y is 0 to about 3, u is 0.

19. The transparent ceramic of claim 14, wherein x is 0, y is 0, u is 0 to about 0.25, and v is greater than 0 to about 0.25.

20. The transparent ceramic of claim 13, wherein the garnet comprises $(RE_{3-u},Sc_u)(Ga_{2-v},Sc_v)Ga_3O_{12}$, where u is 0 to about 0.5, and v is 0 to about 0.5, wherein some Sc is present.

21. The transparent ceramic of claim 13, wherein the garnet comprises $(Gd_{1-a}Y_a)_x (Sc_{1-b}Al_b)_y O_{12} RE_z$, where a is between about 0.05 and about 1; b is between about 0.2 and about 0.99; x is between about 2.8 and about 3.2; y is between about 4.8 and about 5.2; z is between about 0.002 and about 0.5; and RE is Ce and/or Pr.

22. The transparent ceramic of claim 13, wherein the garnet comprises $(Gd_{1-a}Y_a)_x (Ga_{1-b}Al_b)_y O_{12} RE_z$, where a is between about 0.05 and about 1; b is between about 0.2 and about 0.99; x is between about 2.8 and about 3.2; y is between about 4.8 and about 5.2; z is between about 0.002 and about 0.5; and RE is Ce and/or Pr.

23. The transparent ceramic of claim 13, wherein the garnet comprises $Gd_x (Ga_{1-a}Al_a)_y O_{12} RE_z$, where a is between about 0.01 and about 0.99; x is between about 2.8 and about 3.2; y is between about 4.8 and about 5.2; z is between about 0.002 and about 0.5; and RE is Ce and/or Pr.

24. A radiation detector, comprising:
the transparent ceramic of claim 13; and
a photo detector optically coupled to the rare earth garnet.

25. The radiation detector of claim 24, wherein the radiation detector has an energy resolution at 662 keV of less than 5%.

26. The transparent ceramic of claim 13, wherein the ceramic is comprised of sintered particles.

27. The transparent ceramic of claim 13, wherein the ceramic is comprised of particles having interfaces therebetween characteristic of hot isostatic pressing.

28. A system, comprising: the rare earth garnet as recited in claim 13; and a photo detector optically coupled to the rare earth garnet, wherein the garnet comprises $(Gd_{1-a}Y_a)_x (Ga_{1-b}Al_b)_y O_{12} RE_z$, where a is between about 0.0 and about 0.7; b is between about 0.4 and about 0.7; x is between about 2.8 and about 3.2; y is between about 4.8 and about 5.2; z is between about 0.002 and about 0.05; and RE is Ce and/or Pr; wherein the transparent ceramic is characterized by a scatter coefficient less than about $0.1$ $cm^{-1}$, wherein the radiation detector has an energy resolution at 662 keV of less than 5%.

29. A transparent ceramic, comprising:
a rare earth garnet comprising $(RE_{1-a}Sc_a)_x(Al_{1-b}Ga_b)_yO_{12}$, where a is about 0.05 to about 0.2, x is about 2.8 to about 3.2, b is 0 to about 1, and y is about 4.8 to about 5.2, wherein the rare earth garnet includes secondary phase inclusions in an amount less than about 0.2%.

30. The transparent ceramic of claim 29, wherein the transparent ceramic is characterized by a scatter coefficient less than about $0.1$ $cm^{31\ 1}$.

* * * * *